(12) United States Patent
Yu et al.

(10) Patent No.: US 10,473,533 B2
(45) Date of Patent: Nov. 12, 2019

(54) METHOD AND DEVICE FOR MONITORING TEMPERATURE OF AN ELECTRONIC ELEMENT

(71) Applicant: Quanta Computer Inc., Taoyuan (TW)

(72) Inventors: Chun-Jie Yu, Taoyuan (TW); Cheng-Te Yang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 185 days.

(21) Appl. No.: 15/433,872

(22) Filed: Feb. 15, 2017

(65) Prior Publication Data
US 2018/0113031 A1 Apr. 26, 2018

(30) Foreign Application Priority Data
Oct. 25, 2016 (TW) .............................. 105134393 A

(51) Int. Cl.
*G01K 13/00* (2006.01)
*G01K 1/02* (2006.01)

(52) U.S. Cl.
CPC .............. *G01K 13/00* (2013.01); *G01K 1/02* (2013.01)

(58) Field of Classification Search
CPC ...... G01K 13/00; G01K 1/02; G06F 11/3058; G06F 1/206; G06F 9/30083
See application file for complete search history.

(56) References Cited

U.S. PATENT DOCUMENTS

| | | | |
|---|---|---|---|
| 6,112,164 A * | 8/2000 | Hobson | G06F 1/206 |
| | | | 702/132 |
| 7,610,496 B2 * | 10/2009 | Kiim | G06F 1/206 |
| | | | 700/299 |
| 2002/0152406 A1 * | 10/2002 | Watts, Jr. | G06F 1/206 |
| | | | 713/300 |
| 2006/0010353 A1 * | 1/2006 | Haugh | G06F 1/206 |
| | | | 714/47.2 |
| 2006/0018203 A1 * | 1/2006 | Kosaka | G06F 1/206 |
| | | | 369/13.24 |

(Continued)

FOREIGN PATENT DOCUMENTS

TW 201530304 A 8/2015

OTHER PUBLICATIONS

Chinese language office action dated Aug. 22, 2017, issued in application No. TW 105134393.
(Continued)

*Primary Examiner* — Lisa M Caputo
*Assistant Examiner* — Philip L Cotey
(74) *Attorney, Agent, or Firm* — McClure, Qualey & Rodack, LLP

(57) ABSTRACT

A method for monitoring temperature of an electronic element is provided. The method is used in an embedded controller of a device and includes: determining whether the temperature reading is higher than or equal to a temperature threshold; increasing a time value of a timer with an accumulated time value when the temperature reading is higher than or equal to the temperature threshold; determining whether the time value is greater than or equal to a time threshold; and transmitting a notification signal to a basic input/output system (BIOS) to notify the BIOS to read the temperature reading when the time value is greater than or equal to the time threshold.

12 Claims, 3 Drawing Sheets

(56) References Cited

U.S. PATENT DOCUMENTS

| | | | |
|---|---|---|---|
| 2006/0174146 A1* | 8/2006 | Prosperi | G06F 1/206 713/320 |
| 2007/0005215 A1* | 1/2007 | Nishioka | G01P 21/00 701/74 |
| 2007/0086160 A1* | 4/2007 | Wang | G06F 1/206 361/690 |
| 2010/0153698 A1* | 6/2010 | Chiu | G11B 33/144 713/2 |
| 2011/0106332 A1* | 5/2011 | Lee | G06F 1/206 700/300 |
| 2012/0084551 A1* | 4/2012 | Cheng | G06F 1/206 713/2 |
| 2012/0095719 A1* | 4/2012 | Araki | G01K 13/00 702/130 |
| 2014/0032011 A1* | 1/2014 | Artman | G05D 23/1932 700/300 |
| 2014/0123287 A1* | 5/2014 | Ahuja | G06F 21/00 726/23 |
| 2016/0240061 A1 | 8/2016 | Li et al. | |

OTHER PUBLICATIONS

TW Office Action dated May 19, 2017 in corresponding Taiwan application (No. 105134393).

* cited by examiner

METHOD AND DEVICE FOR MONITORING TEMPERATURE OF AN ELECTRONIC ELEMENT

CROSS REFERENCE TO RELATED APPLICATIONS

This application claims priority of Taiwan Patent Application No. 105134393, filed on Oct. 25, 2016, the disclosures of which are incorporated herein by reference in their entirety.

BACKGROUND OF THE INVENTION

Field of the Invention

The invention relates to a method and a device for monitoring the temperature of an electronic element. More specifically, the present invention relates to a method and a device for monitoring the temperature of an electronic element by using an embedded controller.

Description of the Related Art

Mobile devices are gaining in popularity, in part because of their decreasing prices and increasing performance. However, as their performance capabilities are improved, the need to control the operating temperature of the mobile devices becomes increasingly important.

Currently, a central processing unit (CPU) in a mobile device cannot actively receive all of the temperature information from the mobile device. The CPU needs to receive the temperature readings of all components in the mobile device through an embedded controller and notify a basic input/output system (BIOS) to read the sensed temperature readings. Next, a driver will control the temperature of the mobile device.

However, when the frequency with which the BIOS is notified by the embedded controller to read the temperature readings is higher, operating performance of the mobile device and efficiency of standby power will be lower due to hardware interrupts. Traditionally, the embedded controller notifies the BIOS to read the sensed temperature values with a fixed period duration. One drawback of this scheme is that the embedded controller cannot immediately notify the BIOS to read the sensed temperature readings when the load on the mobile device is changing rapidly, so that the driver cannot immediately control the temperature.

Accordingly, there is a need for a method and a device for monitoring the temperature of an electronic element to solve these problems.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select implementations, not all implementations, are described further in the detailed description below. Thus, the following summary is not intended to identify essential features of the claimed subject matter, nor is it intended for use in determining the scope of the claimed subject matter.

A method and a device for monitoring the temperature of an electronic element are provided.

In a preferred embodiment, a method for monitoring temperature of an electronic element is provided in the invention. The method is used in an embedded controller of a device, and comprises: receiving a temperature reading of the electronic element sensed by a temperature sensor; determining whether the temperature reading is higher than or equal to a temperature threshold; increasing a time value of a timer with an accumulated time value when the temperature reading is higher than or equal to the temperature threshold; determining whether the time value is greater than or equal to a time threshold; and transmitting a notification signal to a basic input/output system (BIOS) to notify the BIOS to read the temperature reading when the time value is greater than or equal to the time threshold.

In some embodiments, the embedded controller receives the temperature reading sensed by the temperature sensor with a predetermined period of time. In some embodiments, when the time value is shorter than the time threshold, the method further comprises: obtaining a variation corresponding to the temperature reading according to a table of temperature intervals; calculating a difference between the temperature reading and a temperature baseline; determining whether the difference is greater than or equal to the variation; and transmitting the notification signal to the BIOS to notify the BIOS to read the temperature reading when the difference is greater than or equal to the variation. In some embodiments, after transmitting the notification signal to the BIOS to notify the BIOS to read the temperature reading, the method further comprises: setting the temperature baseline to be the same as the temperature reading. In some embodiments, the temperature baseline is initially set to zero.

In a preferred embodiment, a device for monitoring temperature of an electronic element is provided in the invention. The device comprises a temperature sensor, a basic input/output system (BIOS), and an embedded controller. The temperature sensor is coupled to the electronic element and senses a temperature reading of the electronic element. The embedded controller is coupled to the temperature sensor and the BIOS. The embedded controller receives the temperature reading, determines whether the temperature reading is higher than or equal to a temperature threshold, increases a time value of a timer of the embedded controller with an accumulated time value when the temperature reading is higher than or equal to the temperature threshold, determines whether the time value is greater than or equal to a time threshold, and transmits a notification signal to the BIOS to notify the BIOS to read the temperature reading when the time value is greater than or equal to the time threshold.

In some embodiments, the embedded controller receives the temperature reading sensed by the temperature sensor with a predetermined period of time. In some embodiments, when the time value is shorter than the time threshold, the embedded controller is further used to: obtain a variation corresponding to the temperature reading according to a table of temperature intervals; calculate a difference between the temperature reading and a temperature baseline; determine whether the difference is greater than or equal to the variation; and transmit the notification signal to the BIOS to notify the BIOS to read the temperature reading when the difference is greater than or equal to the variation. In some embodiments, after transmitting the notification signal to the BIOS to notify the BIOS to read the temperature reading, the embedded controller is further used to: set the temperature baseline to be the same as the temperature reading. In some embodiments, the temperature baseline is initially set to zero.

BRIEF DESCRIPTION OF DRAWINGS

The accompanying drawings are included to provide a further understanding of the invention, and are incorporated in and constitute a part of the present invention. The drawings illustrate implementations of the invention and, together with the description, serve to explain the principles of the invention.

DETAILED DESCRIPTION OF THE INVENTION

Figure 1:
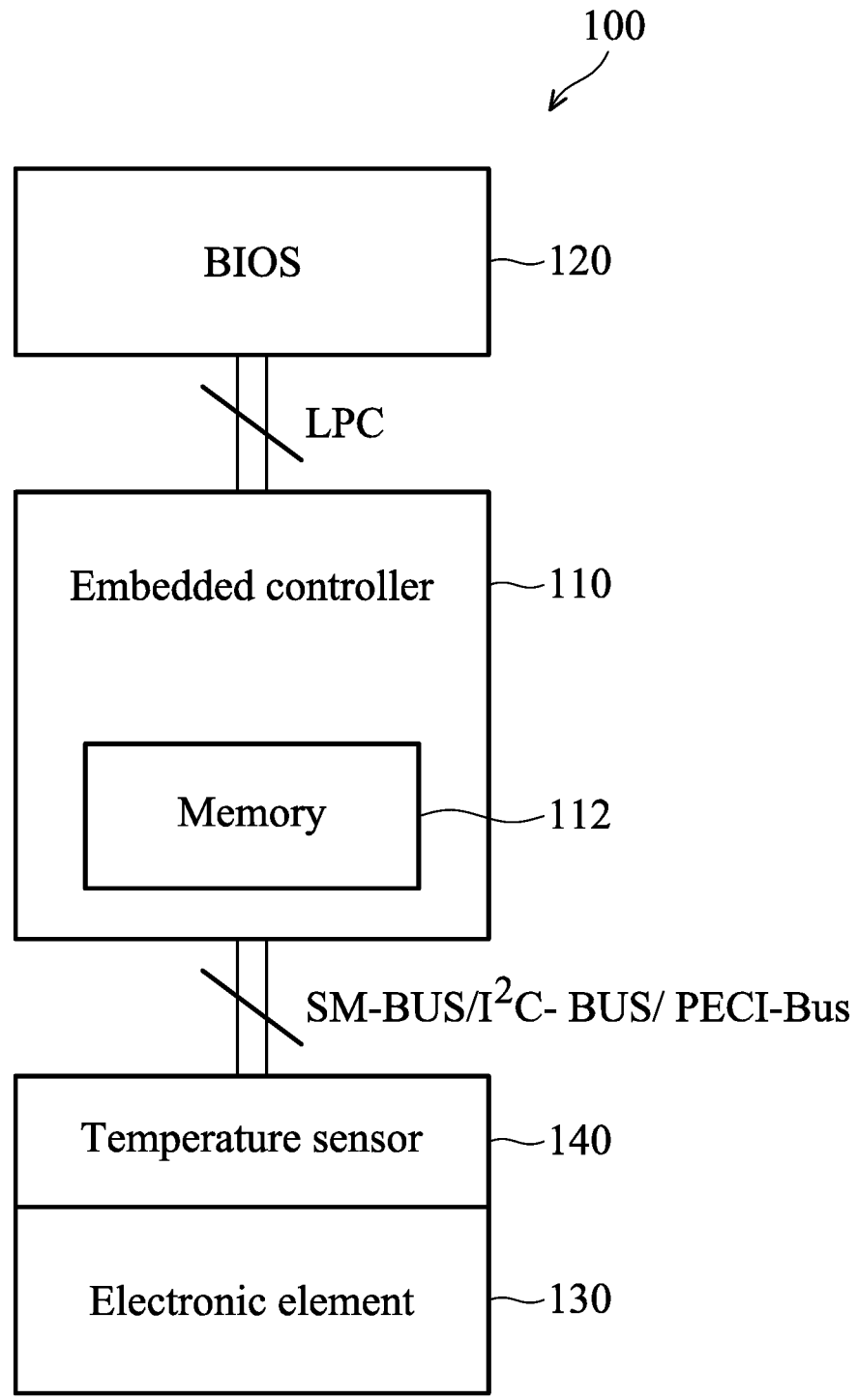
FIG. 1 shows a device for monitoring the temperature of a device 100 in accordance with one embodiment of the invention.

Several exemplary embodiments of the present disclosure are described with reference to FIGS. 1 through 2 which generally relate to a method and a device for monitoring the temperature of an electronic element. It should be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

FIG. 1 shows a device 100 for monitoring the temperature of an electronic element 130 in accordance with one embodiment of the invention. The device 100 can include any instrument or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the device 100 can be a personal computer, a laptop computer, a smartphone, a tablet device, or another consumer electronic device, a network server, a network storage device, a switch, a router, or another network communications device, or any other suitable device. Furthermore, the device 100 can include processing resources for executing machine-executable code, such as a central processing unit (CPU), a programmable logic array (PLA), an embedded device such as a System-on-a-Chip (SoC), or other control logic hardware. The device 100 can also include one or more computer-readable mediums for storing machine-executable code, such as software or data. Additional components of the device 100 can include one or more storage devices that can store the machine-executable code, one or more communications ports for communicating with external devices, and various input and output (I/O) devices, such as a keyboard, a mouse, and a video display.

The device 100 comprises at least an embedded controller 110, a basic input/output system (BIOS) 120, an electronic element 130 and a temperature sensor 140.

The described components are mutually connected via a Low Pin Count (LPC) Bus and a System Management Bus (SM-BUS)/Inter-Integrated Circuit Bus ($I^2$C-BUS)/Platform Environmental Control Interface Bus (PECI-Bus).

The electronic element 130 may be a CPU, a graphics processing unit (GPU), a chipset, a power supply, or the like.

The temperature sensor 140 can be coupled to the electronic element 130 to sense a temperature reading of the electronic element 130. The temperature sensor 140 could be any suitable temperature sensor that can accurately and reliably provide an output which is indicative of the temperature reading of the electronic element 130.

The embedded controller 110 can provide status information and control of the electronic element 130 of the device 100, such as thermal status monitoring of the CPU, of the GPU, or of other components. In a particular embodiment, the embedded controller 110 can permit the programming of a system BIOS Read Only Memory (ROM) and other firmware devices of the device 100. The embedded controller 110 may comprise a memory 112 and a timer (not shown in FIG. 1), which together function to monitor the temperature reading of the electronic element 130.

The memory 112 represents a data storage capacity associated with the embedded controller 110, and may be used to securely store firmware to be executed by the embedded controller 110. The memory 112 can be a volatile memory such as a Random Access Memory (RAM), a non-volatile memory such as a Flash memory device, or a combination thereof. Furthermore, the memory 112 can be integrated with the embedded controller 110, can be external to the embedded controller 110, or can include an integrated memory portion and an external memory portion.

The memory 112 can store a table of temperature intervals, which records the relationship between the temperature reading T (° C.) sensed by the temperature sensor 140 and a variation $\Delta$. For example, TABLE 1 is a table of temperature intervals established by a user in advance.

TABLE 1

| Temperature reading T (° C.) sensed by the temperature sensor | Variation $\Delta$ |
| --- | --- |
| $0 \leq T < 50$ | 5 |
| $50 \leq T < 90$ | 3 |
| $90 \leq T$ | 1 |

As shown in TABLE 1, when the temperature reading sensed by the temperature sensor 140 is higher than or equal to 0° C. and is lower than 50° C., the variation corresponding to the temperature reading is 5. When the temperature reading sensed by the temperature sensor 140 is higher than or equal to 50° C. and is lower than 90° C., the variation corresponding to the temperature reading is 3. When the temperature reading sensed by the temperature sensor 140 is higher than or equal to 90° C., the variation corresponding to the temperature reading is 1.

The memory 112 may also store a temperature baseline, a temperature threshold, a time threshold, a time value, an accumulated time value, a predetermined period of time, and other information established by the user in advance, wherein the time value and the temperature baseline can be initially set to zero.

The embedded controller 110 receives the temperature reading of the electronic element 130 sensed by the temperature sensor 140 and stores it in the memory 112. Next, the embedded controller 110 determines whether the temperature reading is higher than or equal to a temperature threshold. When the temperature reading is higher than or equal to the temperature threshold, a timer of the embedded controller 110 increases a time value of the timer with an accumulated time value. When the temperature reading is lower than the temperature threshold, the timer of the embedded controller 110 sets the time value to a predetermined time value (for example, 0).

Next, the embedded controller 110 determines whether the time value is greater than or equal to a time threshold. When the time value is greater than or equal to the time threshold, the embedded controller 110 transmits a notification signal to the BIOS 120 to notify the BIOS 120 to read the temperature reading stored in the memory 112.

In addition, when the time value of the timer is shorter than the time threshold, the embedded controller 110 obtains a variation corresponding to the temperature reading according to the table of temperature intervals, and calculates a difference between the temperature reading and the temperature baseline. The embedded controller 110 then determines whether the difference is greater than or equal to the variation. When the difference is greater than or equal to the variation, the embedded controller 110 transmits a notification signal to the BIOS 120 to notify the BIOS 120 to read the temperature reading stored in the memory 112.

In one embodiment, the embedded controller 110 receives a new temperature reading of the electronic element 130 sensed by the temperature sensor 140 with a predetermined period of time. In another embodiment, the embedded controller 110 may set the temperature baseline to be the same as the temperature reading after transmitting the notification signal to the BIOS 120 to notify the BIOS 120 to read the temperature reading. Therefore, the temperature baseline will be updated with the predetermined period of time.

Figure 2A:
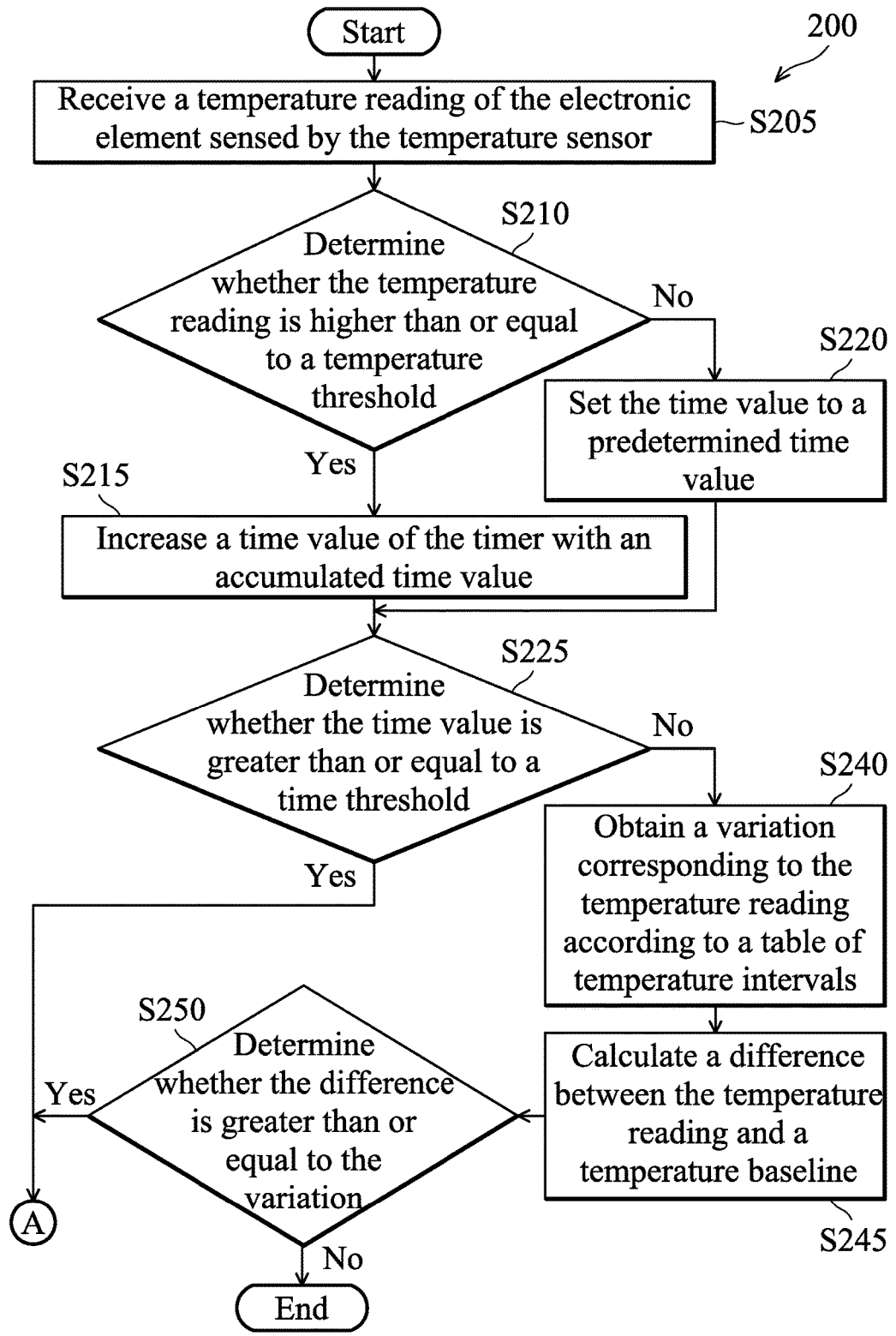
FIGS. 2A~2B is a flow diagram illustrating a method for monitoring the temperature of an electronic element according to an embodiment of the present invention
Figure 2B:
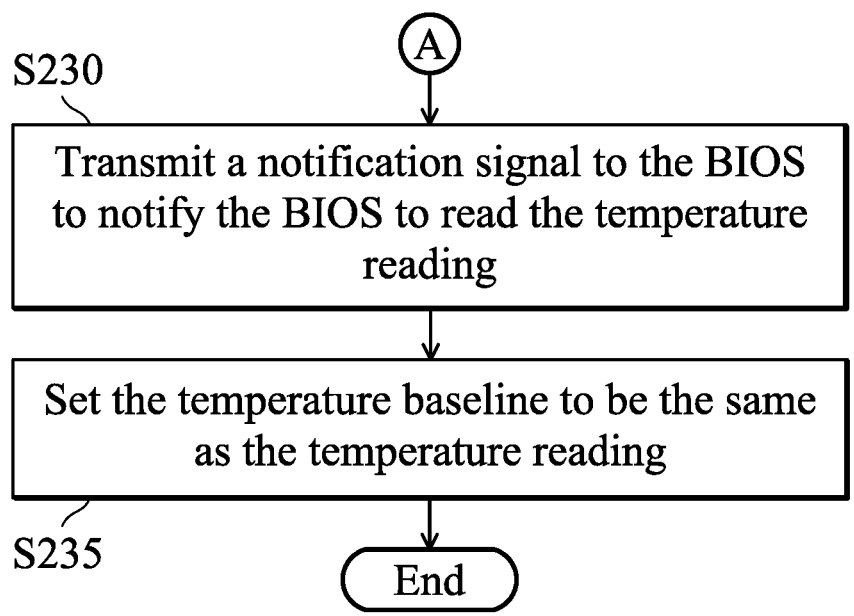

FIGS. 2A~2B is a flow diagram 200 illustrating a method for monitoring the temperature of an electronic element according to an embodiment of the present invention, and the method is used in the device 100 of FIG. 1. In step S205, the embedded controller receives a temperature reading of the electronic element sensed by the temperature sensor. Then, in step S210, the embedded controller determines whether the temperature reading is higher than or equal to a temperature threshold. When the temperature reading is higher than or equal to the temperature threshold ("Yes" in step S210), in step S215, the timer of the embedded controller increases a time value of the timer with an accumulated time value. When the temperature reading is lower than the temperature threshold ("No" in step S210), in step S220, the timer of the embedded controller sets the time value to a predetermined time value.

Then, in step S225, the embedded controller determines whether the time value is greater than or equal to a time threshold. When the time value is greater than or equal to the time threshold ("Yes" in step S225), in step S230, the embedded controller transmits a notification signal to the BIOS to notify the BIOS to read the temperature reading. In step S235, the embedded controller sets the temperature baseline to be the same as the temperature reading. When the time value is shorter than the time threshold ("No" in step S225), in step S240, the embedded controller obtains a variation corresponding to the temperature reading according to a table of temperature intervals.

Next, in step S245, the embedded controller calculates a difference between the temperature reading and a temperature baseline. In step S250, the embedded controller determines whether the difference is greater than or equal to the variation. When the difference is greater than or equal to the variation ("Yes" in step S250), in step S230, the embedded controller transmits a notification signal to the BIOS to notify the BIOS to read the temperature reading. When the difference is smaller than the variation ("No" in step S250), the flow is ended.

In this flow, the embedded controller may receive the temperature reading sensed by the temperature sensor with a predetermined period of time.

In addition, in the above exemplary device, although the method has been described on the basis of the flow diagram using a series of the steps or blocks, the present invention is not limited to the sequence of the steps, and some of the steps may be performed in order different from that of the remaining steps or may be performed simultaneously with the remaining steps. For example, the embedded controller may first determine whether the difference between the temperature reading and the temperature baseline is greater than or equal to the variation, and then may determine whether the temperature reading is higher than or equal to the temperature threshold and whether the time value is greater than or equal to the time threshold. Furthermore, those skilled in the art will understand that the steps shown in the flow diagram are not exclusive and they may include other steps or one or more steps of the flow diagram may be deleted without affecting the scope of the present invention. For example, steps S240, S245 and S250 of FIG. 2A can be omitted, or steps S210, S215, S220 and S225 of FIG. 2A can be omitted.

In addition, the embedded controller could execute the firmware to perform all of the actions and steps described above or others described herein.

Various aspects of the invention have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, controllers, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in ways that vary for each particular application, but such implementation decisions should not be interpreted as causing a departure from the scope of the present invention.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or another programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any specific order or hierarchy of steps in any disclosed process is an example of a sample approach. It should be understood that the specific order or hierarchy of steps in the processes may be rearranged while remaining within the scope of the present invention. The accompanying method claims present elements of the various steps in a sample order, and are not meant to be limited to the specific order or hierarchy presented.

While the invention has been described by way of example and in terms of exemplary embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for monitoring temperature of an electronic element, used in an embedded controller of a device, comprising:
   receiving a temperature reading of the electronic element sensed by a temperature sensor;
   determining whether the temperature reading is higher than or equal to a temperature threshold;
   increasing a time value of a timer with an accumulated time value when the temperature reading is higher than or equal to the temperature threshold;
   determining whether the time value is greater than or equal to a time threshold;
   transmitting a notification signal to a basic input/output system (BIOS) to notify the BIOS to read the temperature reading when the time value is greater than or equal to the time threshold; and
   reading the temperature reading by the BIOS after receiving the notification signal,
   wherein when the time value is shorter than the time threshold, the method further comprises:
   obtaining a variation corresponding to the temperature reading according to a table of temperature intervals;
   calculating a difference between the temperature reading and a temperature baseline;
   determining whether the difference is greater than or equal to the variation; and
   transmitting the notification signal to the BIOS to notify the BIOS to read the temperature reading when the difference is greater than or equal to the variation.

2. The method for monitoring the temperature of an electronic element as claimed in claim 1, wherein the embedded controller receives the temperature reading sensed by the temperature sensor with a predetermined period of time.

3. The method for monitoring the temperature of an electronic element as claimed in claim 1, wherein after transmitting the notification signal to the BIOS to notify the BIOS to read the temperature reading, the method further comprises:
   setting a temperature baseline to be the same as the temperature reading.

4. The method for monitoring the temperature of an electronic element as claimed in claim 3, wherein the temperature baseline is initially set to zero.

5. The method for monitoring the temperature of an electronic element as claimed in claim 1, wherein after transmitting the notification signal to the BIOS to notify the BIOS to read the temperature reading, the method further comprises:
   setting the temperature baseline to be the same as the temperature reading.

6. The method for monitoring the temperature of an electronic element as claimed in claim 5, wherein the temperature baseline is initially set to zero.

7. A device for monitoring the temperature of an electronic element, comprising:
   a temperature sensor, coupled to the electronic element, configured to sense a temperature reading of the electronic element;
   a basic input/output system (BIOS); and
   an embedded controller, coupled to the temperature sensor and the BIOS, configured to:
   receive the temperature reading,
   determine whether the temperature reading is higher than or equal to a temperature threshold,
   increase a time value of a timer of the embedded controller with an accumulated time value when the temperature reading is higher than or equal to the temperature threshold,
   determine whether the time value is greater than or equal to a time threshold,
   transmit a notification signal to the BIOS to notify the BIOS to read the temperature reading when the time value is greater than or equal to the time threshold, and
   read the temperature reading by the BIOS after receiving the notification signal,
   wherein when the time value is shorter than the time threshold, the embedded controller is further configured to:
   obtain a variation corresponding to the temperature reading according to a table of temperature intervals;
   calculate a difference between the temperature reading and a temperature baseline;
   determine whether the difference is greater than or equal to the variation; and transmit the notification signal to the BIOS to notify the BIOS to read the temperature reading when the difference is greater than or equal to the variation.

8. The device for monitoring the temperature of an electronic element as claimed in claim 7, wherein the embedded controller receives the temperature reading sensed by the temperature sensor within a predetermined period of time.

9. The device for monitoring the temperature of an electronic element as claimed in claim 7, wherein after transmitting the notification signal to the BIOS to notify the BIOS to read the temperature reading, the embedded controller is further configured to:

set a temperature baseline to be the same as the temperature reading.

10. The device for monitoring the temperature of an electronic element as claimed in claim 9, wherein the temperature baseline is initially set to zero.

11. The device for monitoring the temperature of an electronic element as claimed in claim 7, wherein after transmitting the notification signal to the BIOS to notify the BIOS to read the temperature reading, the embedded controller is further configured to:

set the temperature baseline to be the same as the temperature reading.

12. The device for monitoring the temperature of an electronic element as claimed in claim 11, wherein the temperature baseline is initially set to zero.

* * * * *